US010446328B2

(12) United States Patent
Knopsnyder et al.

(10) Patent No.: US 10,446,328 B2
(45) Date of Patent: Oct. 15, 2019

(54) MULTI-CELL ULTRACAPACITOR

(71) Applicant: AVX Corporation, Fountain Inn, SC (US)

(72) Inventors: Jonathan Robert Knopsnyder, Fountain Inn, SC (US); Shawn Hansen, Simpsonville, SC (US); Andrew P. Ritter, Simpsonville, SC (US)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 15/598,865

(22) Filed: May 18, 2017

(65) Prior Publication Data

US 2017/0338054 A1 Nov. 23, 2017

Related U.S. Application Data

(60) Provisional application No. 62/339,172, filed on May 20, 2016.

(51) Int. Cl.
*H01G 11/12* (2013.01)
*H01G 9/00* (2006.01)
(Continued)

(52) U.S. Cl.
CPC .......... *H01G 11/12* (2013.01); *H01G 9/0003* (2013.01); *H01G 9/016* (2013.01); *H01G 9/08* (2013.01);
(Continued)

(58) Field of Classification Search
CPC ........ H01G 11/32; H01G 11/12; H01G 11/60; H01G 11/68; H01G 11/82; H01G 9/08; H01G 9/26
See application file for complete search history.

(56) References Cited

U.S. PATENT DOCUMENTS 3,652,902 A 3/1972 Hart et al.
4,267,565 A 5/1981 Puppolo et al.
(Continued)

FOREIGN PATENT DOCUMENTS

CN 203406180 U 1/2014
CN 203596278 U 5/2014
(Continued)

OTHER PUBLICATIONS

Product Information on TIMREX® Graphite and ENSACO™ Carbon Black from TIMCAL LTD., 2004, 24 pages.
(Continued)

*Primary Examiner* — Nguyen T Ha
(74) *Attorney, Agent, or Firm* — Dority & Manning, P.A.

(57) ABSTRACT

An ultracapacitor that comprises a first and second electrochemical cell that are connected in parallel is provided. The cells are define by a first electrode that contains a current collector having opposing sides coated with a carbonaceous material, a second electrode that contains a current collector having opposing sides coated with a carbonaceous material, and a separator positioned between the first electrode and the second electrode. The second cell is by the second electrode, a third electrode that contains a current collector having opposing sides coated with a carbonaceous material, and a separator positioned between the second electrode and the third electrode. The ultracapacitor also contains a nonaqueous electrolyte that is in ionic contact with the electrodes and contains a nonaqueous solvent and an ionic liquid. A package encloses the first cell, the second cell, and the nonaqueous electrolyte.

26 Claims, 3 Drawing Sheets

(51) Int. Cl.
*H01G 9/008* (2006.01)
*H01G 9/08* (2006.01)
*H01G 9/26* (2006.01)
*H01G 11/18* (2013.01)
*H01G 11/32* (2013.01)
*H01G 11/60* (2013.01)
*H01G 11/68* (2013.01)
*H01G 11/82* (2013.01)
*H01G 11/24* (2013.01)
*H01G 11/62* (2013.01)
*H01G 11/70* (2013.01)
*H01G 11/76* (2013.01)
*H01G 11/78* (2013.01)
*H01G 11/52* (2013.01)

(52) U.S. Cl.
CPC .............. *H01G 9/26* (2013.01); *H01G 11/18* (2013.01); *H01G 11/24* (2013.01); *H01G 11/32* (2013.01); *H01G 11/60* (2013.01); *H01G 11/62* (2013.01); *H01G 11/68* (2013.01); *H01G 11/70* (2013.01); *H01G 11/76* (2013.01); *H01G 11/78* (2013.01); *H01G 11/82* (2013.01); *H01G 11/52* (2013.01); *Y02E 60/13* (2013.01)

(56) References Cited

U.S. PATENT DOCUMENTS

| | | |
|---|---|---|
| 4,267,566 A | 5/1981 | Moresi, Jr. |
| 4,766,523 A | 8/1988 | Mori |
| 4,952,465 A | 8/1990 | Harris et al. |
| 5,079,674 A | 1/1992 | Malaspina |
| 5,150,283 A | 9/1992 | Yoshida et al. |
| 5,279,623 A | 1/1994 | Watanabe et al. |
| 5,381,303 A | 1/1995 | Yoshida et al. |
| 5,426,561 A | 6/1995 | Yen et al. |
| 5,445,856 A | 8/1995 | Charloner-Gill |
| 5,532,083 A | 7/1996 | McCullough |
| 5,591,540 A | 1/1997 | Louie et al. |
| 5,621,607 A | 4/1997 | Farahmandi et al. |
| 5,777,428 A | 7/1998 | Farahmandi et al. |
| 5,850,331 A | 12/1998 | Matsumoto et al. |
| 5,862,035 A | 1/1999 | Farahmandi et al. |
| 5,973,913 A | 10/1999 | McEwen et al. |
| 6,059,847 A | 5/2000 | Farahmandi et al. |
| 6,064,561 A | 5/2000 | Harada et al. |
| 6,064,562 A | 5/2000 | Okamura |
| 6,094,788 A | 8/2000 | Farahmandi et al. |
| 6,152,970 A | 11/2000 | Wei et al. |
| 6,187,061 B1 | 2/2001 | Amatucci et al. |
| 6,198,620 B1 | 3/2001 | Wei et al. |
| 6,212,061 B1 | 4/2001 | Irwin et al. |
| 6,304,426 B1 | 10/2001 | Wei et al. |
| 6,310,762 B1 | 10/2001 | Okamura et al. |
| 6,320,741 B1 | 11/2001 | Ohya et al. |
| 6,335,858 B1 | 1/2002 | Vasechkin et al. |
| 6,341,058 B1 | 1/2002 | Sakata et al. |
| 6,349,027 B1 | 2/2002 | Suhara et al. |
| 6,352,565 B2 | 3/2002 | Suhara et al. |
| 6,364,915 B1 | 4/2002 | Chapman-Irwin et al. |
| 6,379,402 B1 | 4/2002 | Suhara et al. |
| 6,396,682 B1 | 5/2002 | Kim et al. |
| 6,414,837 B1 | 7/2002 | Sato et al. |
| 6,424,517 B1 | 7/2002 | Ikeda et al. |
| 6,426,865 B2 | 7/2002 | Kasahara et al. |
| 6,430,031 B1 | 8/2002 | Dispennette et al. |
| 6,447,555 B1 | 9/2002 | Okamura et al. |
| 6,449,139 B1 | 9/2002 | Farahmandi et al. |
| 6,466,429 B1 | 10/2002 | Volkovich et al. |
| 6,493,209 B1 | 12/2002 | Kamath et al. |
| 6,493,210 B2 | 12/2002 | Nonaka et al. |
| 6,507,479 B2 | 1/2003 | Saito et al. |
| 6,525,924 B2 | 2/2003 | Gallay et al. |
| 6,532,144 B2 | 3/2003 | Ohya et al. |
| 6,552,895 B1 | 4/2003 | Vassallo et al. |
| 6,558,437 B2 | 5/2003 | Wei et al. |
| 6,576,365 B1 | 6/2003 | Meitav et al. |
| 6,602,742 B2 | 8/2003 | Maletin et al. |
| 6,627,343 B1 | 9/2003 | Kim et al. |
| 6,628,504 B2 | 9/2003 | Volkovich et al. |
| 6,631,072 B1 | 10/2003 | Paul et al. |
| 6,636,417 B2 | 10/2003 | Sakata et al. |
| 6,643,119 B2 | 11/2003 | Nanjundiah et al. |
| 6,653,018 B2 | 11/2003 | Takahashi et al. |
| 6,697,249 B2 | 2/2004 | Maletin et al. |
| 6,726,732 B2 | 4/2004 | Kim et al. |
| 6,728,095 B2 | 4/2004 | Suhara et al. |
| 6,740,447 B1 | 5/2004 | Keshishian |
| 6,741,450 B2 | 5/2004 | Nakazawa et al. |
| 6,743,544 B2 | 6/2004 | Kim et al. |
| 6,751,084 B2 | 6/2004 | Nakazawa et al. |
| 6,830,594 B2 | 12/2004 | Shinozaki et al. |
| 6,842,330 B2 | 1/2005 | Farahmandi et al. |
| 6,843,810 B2 | 1/2005 | Nakazawa et al. |
| 6,847,517 B2 | 1/2005 | Iwaida et al. |
| 6,870,725 B2 | 3/2005 | Sakata et al. |
| 6,898,067 B1 | 5/2005 | Hiratsuka et al. |
| 6,944,010 B1 | 9/2005 | Paul et al. |
| 6,955,694 B2 | 10/2005 | Bendale et al. |
| 7,019,960 B2 | 3/2006 | Okamura et al. |
| 7,054,139 B2 | 5/2006 | James et al. |
| 7,057,879 B2 | 6/2006 | Iwaida et al. |
| 7,061,750 B2 | 6/2006 | Oyama et al. |
| 7,074,688 B2 | 7/2006 | Kurihara et al. |
| 7,090,706 B2 | 8/2006 | Farahmandi et al. |
| 7,095,603 B2 | 8/2006 | Mahon et al. |
| 7,116,545 B2 | 10/2006 | Farahmandi et al. |
| 7,154,738 B2 | 12/2006 | Oyama et al. |
| 7,170,738 B2 | 1/2007 | Scheidegger et al. |
| 7,177,139 B2 | 2/2007 | Oizumi |
| 7,227,737 B2 | 6/2007 | Mitchell et al. |
| 7,233,482 B2 | 6/2007 | James et al. |
| 7,236,349 B2 | 6/2007 | Miyaki et al. |
| 7,245,478 B2 | 7/2007 | Zhong et al. |
| 7,256,981 B2 | 8/2007 | Kosuda et al. |
| 7,273,597 B2 | 9/2007 | Takeuchi et al. |
| 7,303,974 B2 | 12/2007 | Hinoki et al. |
| 7,310,219 B2 | 12/2007 | Kosuda et al. |
| 7,325,285 B2 | 2/2008 | Bulliard et al. |
| 7,326,491 B2 | 2/2008 | Takahashi et al. |
| 7,382,600 B2 | 6/2008 | Paul et al. |
| 7,403,371 B2 | 7/2008 | Miyaki et al. |
| 7,405,922 B2 | 7/2008 | Kawaguchi et al. |
| 7,407,520 B2 | 8/2008 | Farahmandi et al. |
| 7,486,497 B2 | 2/2009 | Kobayashi et al. |
| 7,503,942 B2 | 3/2009 | Kurihara et al. |
| 7,554,790 B2 | 6/2009 | James et al. |
| 7,570,478 B2 | 8/2009 | Terada et al. |
| 7,595,131 B2 | 9/2009 | James et al. |
| 7,623,339 B2 | 11/2009 | Takahashi et al. |
| 7,811,337 B2 | 10/2010 | Zhong et al. |
| 7,820,337 B2 | 10/2010 | Naoi et al. |
| 7,830,646 B2 | 11/2010 | Eilertsen |
| 7,855,013 B2 | 12/2010 | Ohashi et al. |
| 7,864,508 B2 | 1/2011 | Fukumine |
| 7,920,371 B2 | 4/2011 | Mitchell et al. |
| 7,939,600 B2 | 5/2011 | Mori et al. |
| 7,948,738 B2 | 5/2011 | Shimamoto et al. |
| 8,094,433 B2 | 1/2012 | Tian et al. |
| 8,098,481 B2 | 1/2012 | Zong et al. |
| 8,098,482 B2 | 1/2012 | Clelland et al. |
| 8,098,483 B2 | 1/2012 | Eilertsen |
| 8,223,473 B2 | 7/2012 | Dreissig et al. |
| 8,248,756 B2 | 8/2012 | Higawara et al. |
| 8,263,256 B2 | 9/2012 | Hatta et al. |
| 8,329,326 B2 | 12/2012 | Suto |
| 8,343,669 B2 | 1/2013 | Naoi et al. |
| 8,351,182 B2 | 1/2013 | Yamada et al. |
| 8,435,669 B2 | 5/2013 | Tsukamoto et al. |
| 8,455,136 B2 | 6/2013 | Ishida et al. |
| 8,472,164 B2 | 6/2013 | Kim |
| 8,486,561 B2 | 7/2013 | Tsukamoto et al. |

(56) References Cited

U.S. PATENT DOCUMENTS

| | | | |
|---|---|---|---|
| 8,497,225 B2 | 7/2013 | Zhamu et al. | |
| 8,536,465 B2 | 9/2013 | Hagiwara et al. | |
| 8,537,525 B2 | 9/2013 | Yamazaki et al. | |
| 8,591,757 B2 | 11/2013 | Ohishi et al. | |
| 8,619,409 B2 | 12/2013 | Yawata et al. | |
| 8,652,687 B2 | 2/2014 | Zhamu et al. | |
| 8,705,225 B2 | 4/2014 | Ohashi et al. | |
| 8,749,953 B2 | 6/2014 | Momo et al. | |
| 8,760,851 B2 | 6/2014 | Signorelli et al. | |
| 8,765,277 B2 | 7/2014 | Yawata et al. | |
| 8,780,527 B2 | 7/2014 | Thompson et al. | |
| 8,804,310 B2 | 8/2014 | Terui et al. | |
| 8,848,338 B2 | 9/2014 | Norieda et al. | |
| 8,871,383 B2 | 10/2014 | Hatta et al. | |
| 8,902,594 B2 | 12/2014 | Goto et al. | |
| 8,932,750 B2 | 1/2015 | Cooley et al. | |
| 8,947,856 B2 | 2/2015 | Wang et al. | |
| 8,964,357 B2 | 2/2015 | Tamachi et al. | |
| 8,982,535 B2 | 3/2015 | Soulliere et al. | |
| 9,048,030 B2 | 6/2015 | Hasegawa et al. | |
| 9,083,013 B2 | 7/2015 | Itoh et al. | |
| 9,142,357 B2 | 9/2015 | Matsumoto | |
| 9,178,186 B2 | 11/2015 | Hatta et al. | |
| 9,209,434 B2 | 12/2015 | Epstein | |
| 9,236,632 B2 | 1/2016 | Ohashi et al. | |
| 9,368,293 B2 | 6/2016 | Yoshikawa et al. | |
| 9,478,366 B2 | 10/2016 | Yokouchi et al. | |
| 9,514,893 B2 | 12/2016 | Itaya et al. | |
| 9,558,893 B2 | 1/2017 | Horikawa et al. | |
| 9,558,894 B2 | 1/2017 | Signorelli et al. | |
| 9,576,746 B2 | 2/2017 | Ueno et al. | |
| 9,595,398 B2 | 3/2017 | Gadkaree et al. | |
| 9,620,300 B2 | 4/2017 | Saya | |
| 9,679,703 B2 | 6/2017 | Bendale et al. | |
| 9,705,110 B2 | 7/2017 | Hatta et al. | |
| 9,728,343 B2 | 8/2017 | Horikawa et al. | |
| 9,748,046 B2 | 8/2017 | Ueda et al. | |
| 9,818,552 B2 | 11/2017 | Lane et al. | |
| 9,871,232 B2 | 1/2018 | Hatta et al. | |
| 9,911,547 B2 | 3/2018 | Horikawa | |
| 10,134,532 B2 | 11/2018 | Horikawa et al. | |
| 10,163,570 B2 | 12/2018 | Aoki et al. | |
| 2002/0102464 A1* | 8/2002 | Yoshida | H01G 9/038 429/300 |
| 2002/0138958 A1 | 10/2002 | Nonaka et al. | |
| 2002/0164441 A1 | 11/2002 | Amine et al. | |
| 2003/0172509 A1 | 9/2003 | Maletin et al. | |
| 2004/0146786 A1* | 7/2004 | Sato | H01G 9/038 429/326 |
| 2004/0229117 A1 | 11/2004 | Mitani et al. | |
| 2005/0034299 A1* | 2/2005 | Kurihara | H01G 9/155 29/623.5 |
| 2005/0219799 A1 | 10/2005 | Paul et al. | |
| 2005/0231891 A1 | 10/2005 | Harvey | |
| 2006/0092596 A1 | 5/2006 | Otsuki et al. | |
| 2006/0175006 A1 | 8/2006 | Takahashi | |
| 2006/0279902 A1 | 12/2006 | Gallay et al. | |
| 2006/0291141 A1* | 12/2006 | Kato | H01G 11/42 361/502 |
| 2007/0020385 A1 | 1/2007 | Naoi et al. | |
| 2007/0025062 A1 | 2/2007 | Miyaki et al. | |
| 2007/0053140 A1 | 3/2007 | Soliz | |
| 2008/0003166 A1 | 1/2008 | Maletin et al. | |
| 2008/0013253 A1 | 1/2008 | Thrap et al. | |
| 2008/0016664 A1 | 1/2008 | Mitchell et al. | |
| 2008/0089006 A1 | 4/2008 | Zhong et al. | |
| 2008/0089012 A1 | 4/2008 | Kon et al. | |
| 2008/0233468 A1* | 9/2008 | Otohata | H01G 2/08 429/53 |
| 2008/0259525 A1 | 10/2008 | Guillet et al. | |
| 2008/0280208 A1* | 11/2008 | Naoi | H01M 10/0431 429/247 |
| 2008/0297981 A1* | 12/2008 | Endo | H01G 9/038 361/502 |
| 2009/0166192 A1 | 7/2009 | Ohashi et al. | |
| 2009/0169979 A1 | 7/2009 | Ohashi et al. | |
| 2009/0180238 A1 | 7/2009 | Gallay et al. | |
| 2009/0279230 A1 | 11/2009 | Eilertsen et al. | |
| 2010/0067173 A1 | 3/2010 | Guillet et al. | |
| 2010/0189881 A1* | 7/2010 | Patibandla | H01G 9/016 427/77 |
| 2010/0266878 A1 | 10/2010 | Eilertsen | |
| 2011/0129710 A1 | 6/2011 | Ohashi et al. | |
| 2012/0044614 A1 | 2/2012 | Hommo et al. | |
| 2012/0045685 A1 | 2/2012 | Seki et al. | |
| 2012/0183886 A1 | 7/2012 | Zhong et al. | |
| 2012/0231337 A1* | 9/2012 | Miyata | C08J 3/05 429/217 |
| 2012/0276421 A1* | 11/2012 | Aihara | H01M 4/133 429/7 |
| 2013/0026978 A1 | 1/2013 | Cooley et al. | |
| 2013/0108915 A1* | 5/2013 | Fukuda | H01M 2/021 429/176 |
| 2013/0108917 A1 | 5/2013 | Kawai et al. | |
| 2013/0120906 A1 | 5/2013 | Soulliere et al. | |
| 2013/0122350 A1 | 5/2013 | Hagiwara et al. | |
| 2013/0280569 A1* | 10/2013 | Mori | H01G 11/72 429/94 |
| 2013/0323585 A1 | 12/2013 | Inoue et al. | |
| 2013/0330637 A1 | 12/2013 | Matsumoto et al. | |
| 2014/0029165 A1 | 1/2014 | Takahashi et al. | |
| 2014/0042988 A1 | 2/2014 | Kuttipillai | |
| 2014/0098465 A1 | 4/2014 | Bendale et al. | |
| 2014/0139972 A1 | 5/2014 | Yokoshima | |
| 2014/0346046 A1 | 11/2014 | Andelman | |
| 2014/0377668 A1 | 12/2014 | Abe et al. | |
| 2015/0207114 A1 | 7/2015 | Khakhalev et al. | |
| 2015/0380175 A1 | 12/2015 | Rawal et al. | |
| 2016/0254104 A1 | 9/2016 | Eilertsen | |
| 2016/0260552 A1 | 9/2016 | Sato et al. | |
| 2017/0288275 A1 | 10/2017 | Yokoshima et al. | |
| 2017/0338055 A1 | 11/2017 | Knopsnyder et al. | |
| 2017/0338059 A1 | 11/2017 | Knopsnyder et al. | |
| 2017/0338061 A1 | 11/2017 | Knopsnyder et al. | |
| 2017/0338669 A1 | 11/2017 | Hansen | |
| 2017/0352855 A1 | 12/2017 | Tsuchiya et al. | |
| 2017/0365420 A1 | 12/2017 | Horikawa et al. | |
| 2018/0006284 A1 | 1/2018 | Tsuchiya et al. | |
| 2018/0047960 A1 | 2/2018 | Yokoshima et al. | |
| 2018/0062135 A1 | 3/2018 | Nagashima et al. | |
| 2018/0123092 A1 | 5/2018 | Hatta et al. | |
| 2018/0144878 A1 | 5/2018 | Ritter et al. | |
| 2018/0158623 A1 | 6/2018 | Kishi | |
| 2018/0190440 A1 | 7/2018 | Horikawa et al. | |
| 2018/0233300 A1 | 8/2018 | Horikawa | |
| 2018/0254448 A1 | 9/2018 | Aya | |
| 2018/0315982 A1 | 11/2018 | Daidoji et al. | |
| 2018/0375066 A1 | 12/2018 | Shibata | |
| 2019/0006123 A1 | 1/2019 | Higuchi | |

FOREIGN PATENT DOCUMENTS

| | | |
|---|---|---|
| EP | 0 938 109 A2 | 8/1999 |
| EP | 1256966 A1 | 11/2002 |
| GB | 2 044 000 B | 8/1983 |
| JP | H 06342739 | 12/1994 |
| JP | H 09270370 A | 10/1997 |
| JP | H 09298129 A | 11/1997 |
| JP | 2002246277 A | 8/2002 |
| JP | 2004253562 | 9/2004 |
| JP | 2012069408 | 4/2012 |
| KR | 100383511 B1 | 5/2003 |
| KR | 100516108 B1 | 9/2005 |
| KR | 20130134964 A | 12/2013 |
| WO | WO0137295 | 5/2001 |
| WO | WO2017/111168 | 6/2017 |
| WO | WO2017/158702 | 9/2017 |
| WO | WO2017/158704 | 9/2017 |
| WO | WO2017/208512 | 12/2017 |

(56) References Cited

FOREIGN PATENT DOCUMENTS

| WO | WO2018/016653 | 1/2018 |
|----|---------------|--------|
| WO | WO2018/016654 | 1/2018 |

OTHER PUBLICATIONS

International Search Report and Written Opinion for PCT/US2017/033134 dated Aug. 28, 2017, 12 pages.

\* cited by examiner

MULTI-CELL ULTRACAPACITOR

RELATED APPLICATIONS

The present application claims priority to U.S. Provisional Application Ser. No. 62/339,172, filed on May 20, 2016, which is incorporated herein in its entirety by reference thereto.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, many conventional ultracapacitors are provided in a rigid metal container. These containers are generally bulky and necessitate the use of prefabricated mounting points within the circuit or apparatus, which makes it difficult to accommodate ultracapacitors of different dimensions. While ultracapacitors have also been developed that employ a flexible housing, they tend to still be relatively bulky and have a relatively low capacitance and high equivalent series resistance ("ESR"). As such, a need currently exists for an improved ultracapacitor.

SUMMARY OF THE INVENTION

In accordance with one embodiment of the present invention, an ultracapacitor is disclosed that comprises a first electrochemical cell connected in parallel with a second electrochemical cell. The first cell is defined by a first electrode that contains a current collector having opposing sides coated with a carbonaceous material, a second electrode that contains a current collector having opposing sides coated with a carbonaceous material, and a separator positioned between the first electrode and the second electrode. The second cell is defined by the second electrode, a third electrode that contains a current collector having opposing sides coated with a carbonaceous material, and a separator positioned between the second electrode and the third electrode. The ultracapacitor also contains a nonaqueous electrolyte that is in ionic contact with the first electrode, second electrode, and third electrodes, wherein the nonaqueous electrolyte contains a nonaqueous solvent and an ionic liquid. A package encloses the first cell, the second cell, and the nonaqueous electrolyte, wherein the package contains a substrate having a thickness of from about 20 micrometers to about 1,000 micrometers.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
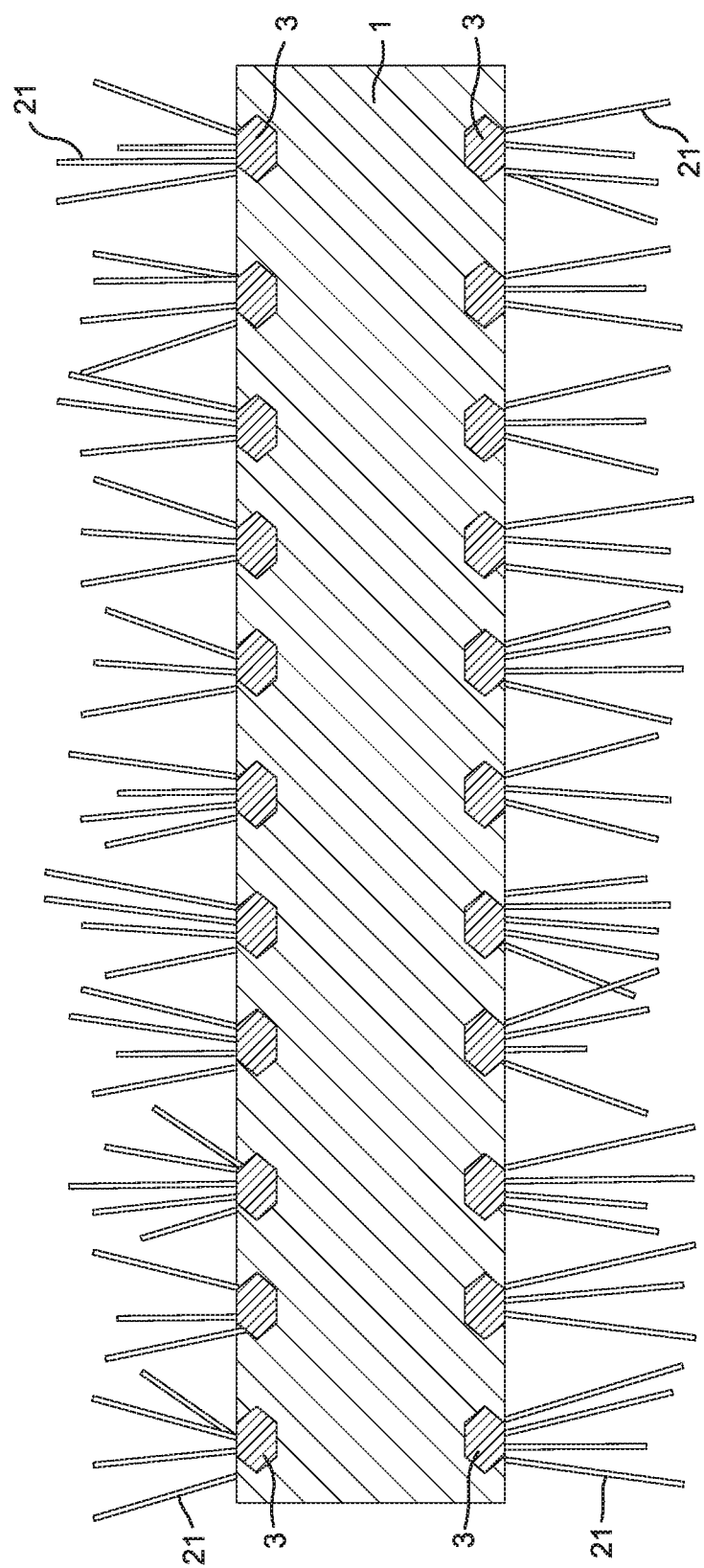
FIG. 1 is a schematic view of one embodiment of a current collector that may be employed in the ultracapacitor of the present invention.
Figure 2:
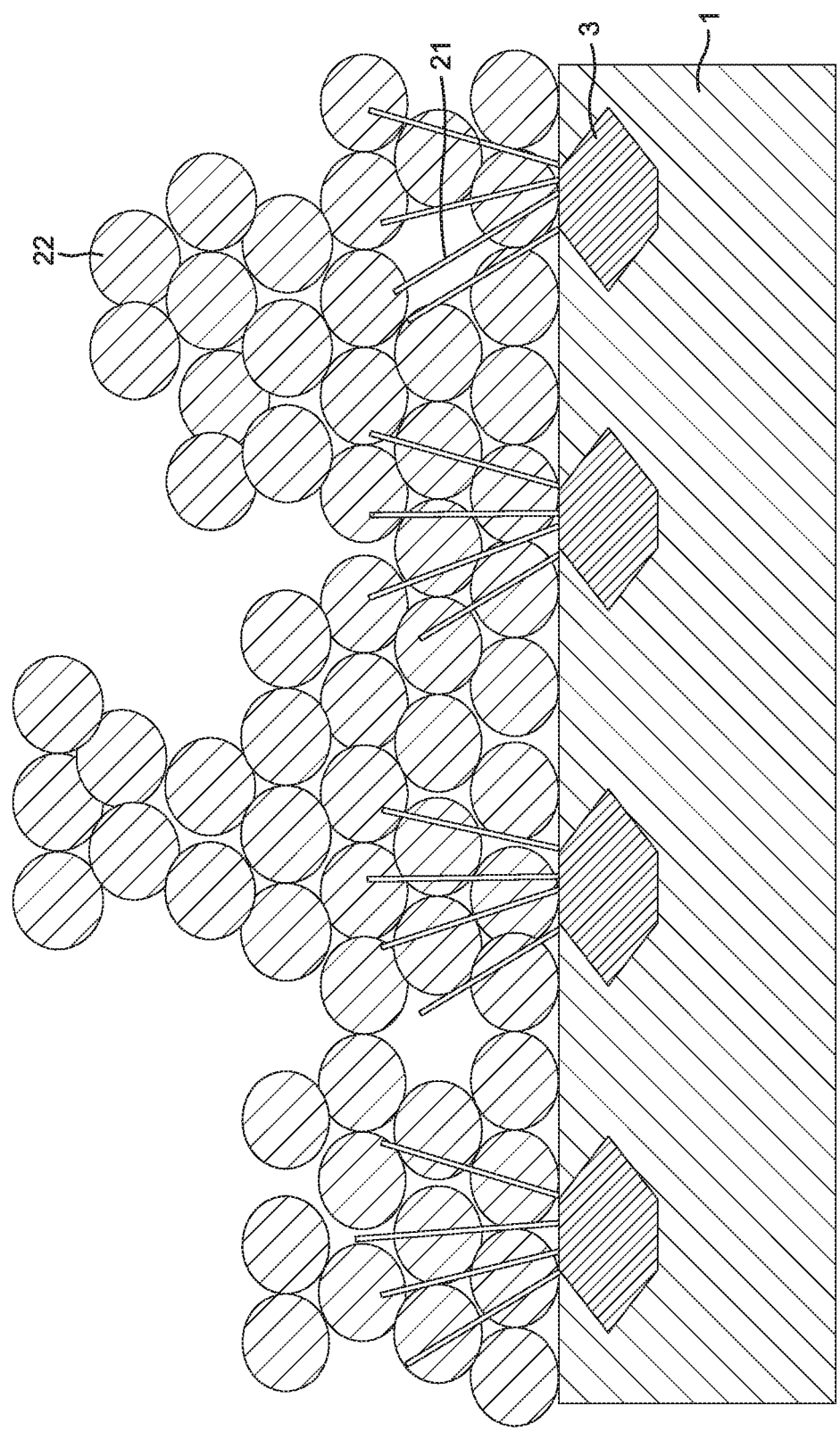
FIG. 2 is a schematic view of one embodiment of a current collector/carbonaceous coating configuration that may be employed in the ultracapacitor of the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed an ultracapacitor that has a high degree of volumetric efficiency in that it is relatively thin in nature but still capable of providing a high degree of capacitance. The ultracapacitor contains at least two electrochemical cells, such as a first cell and a second cell. The first cell is defined by a first electrode that contains a current collector having opposing sides coated with a carbonaceous material (e.g., activated carbon particles), a second electrode that contains a current collector having opposing sides coated with a carbonaceous material (e.g., activated carbon particles), and a separator positioned between the first electrode and the second electrode. The second cell is similarly defined by the second electrode, a third electrode that contains a current collector having opposing sides coated with a carbonaceous material (e.g., activated carbon particles), and a separator positioned between the second electrode and the third electrode. To help achieve the desired properties, the first and second cells are connected in parallel. For example, a first termination is electrically connected to the first electrode and the third electrode and a second termination is electrically connected to the second electrode. An electrolyte is also in ionic contact with the first electrode, second electrode, and third electrodes.

The present inventors have discovered that through selective control over the particular nature of the materials used to form the ultracapacitor, as well as the manner in which they are formed, a variety of beneficial properties may be achieved. For example, the electrolyte is generally nonaqueous in nature and thus contains at least one nonaqueous solvent. The electrolyte also contains at least one ionic liquid, which may be dissolved in the nonaqueous solvent. The electrochemical cells (e.g., electrodes, separators, and electrolyte) are also retained within a relatively thin, flexible package that encloses and seals the components of the ultracapacitor. To help achieve the desired thickness and volumetric efficiency, the package is generally formed from a substrate that is relatively thin in nature, such as having a thickness of from about 20 micrometers to about 1,000 micrometers, in some embodiments from about 50 micrometers to about 800 micrometers, and in some embodiments, from about 100 micrometers to about 600 micrometers. Despite its thin nature, the resulting ultracapacitor can still exhibit excellent electrical properties even when exposed to high temperatures. For example, the ultracapacitor may exhibit a capacitance of about 6 Farads per cubic centimeter ("$F/cm^3$") or more, in some embodiments about 8 $F/cm^3$ or more, in some embodiments from about 9 to about 100 $F/cm^3$, and in some embodiments, from about 10 to about 80 $F/cm^3$, measured at a temperature of 23° C., frequency of 120 Hz, and without an applied voltage. The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a temperature of 23° C., frequency of 1 kHz, and without an applied voltage.

Various embodiments of the present invention will now be described in more detail.

I. Electrodes

As indicated above, the electrodes employed in the electrochemical cells generally contain a current collector. The current collectors of one or more cells may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

In certain embodiments, the current collector may contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). Referring to FIG. 1, for instance, one embodiment of a current collector is shown that contains a plurality of whiskers 21 projecting outwardly from a substrate 1. If desired, the whiskers 21 may optionally project from a seed portion 3 that is embedded within the substrate 1. Similar to the whiskers 21, the seed portion 3 may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

The electrodes used in the ultracapacitor also contain carbonaceous materials that are coated onto opposing sides of the current collectors. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 cm$^3$/g to about 1.5 cm$^3$/g, and in some embodiments, from about 0.4 cm$^3$/g to about 1.0 cm$^3$/g, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

One unique aspect of the present invention is that the electrodes need not contain a substantial amount of binders conventionally employed in ultracapacitor electrodes. That is, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the carbonaceous materials. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous material is coated onto to the sides of a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

II. Nonaqueous Electrolyte

As noted above, the electrolyte employed in the ultracapacitor is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte also contains at least one ionic liquid, which may be dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

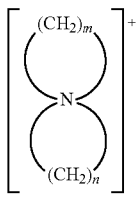

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis (trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

III. Separators

As indicated above, the electrochemical cells of the present invention also contains a separator that is positioned between two electrodes. The separator can enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

IV. Housing

The ultracapacitor of the present invention employs a housing within which the electrodes, electrolyte, and separator of each electrochemical cell are retained. The manner in which the components are inserted into the housing may vary as is known in the art. For example, the electrodes and separator may be initially folded, wound, or otherwise contacted together to form an electrode assembly. The electrolyte may optionally be immersed into the electrodes of the assembly. In one particular embodiment, the electrodes, separator, and optional electrolyte may be wound into an electrode assembly having a "jelly-roll" configuration.

Regardless, the housing is generally in the form of a flexible package that encloses the components of the ultracapacitor. The package contains a substrate that may include any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the package. In this manner, the barrier layer faces the electrochemical cells and the outer layer faces the exterior of the package. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain a sealing layer. The sealing layer may be continuous over the package such that it faces the electrochemical cells. Alternatively, the sealing layer may be employed only at the edges of the capacitor to help seal the package at and around the terminations. Regardless, the sealing layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth) acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth) acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

Figure 3:
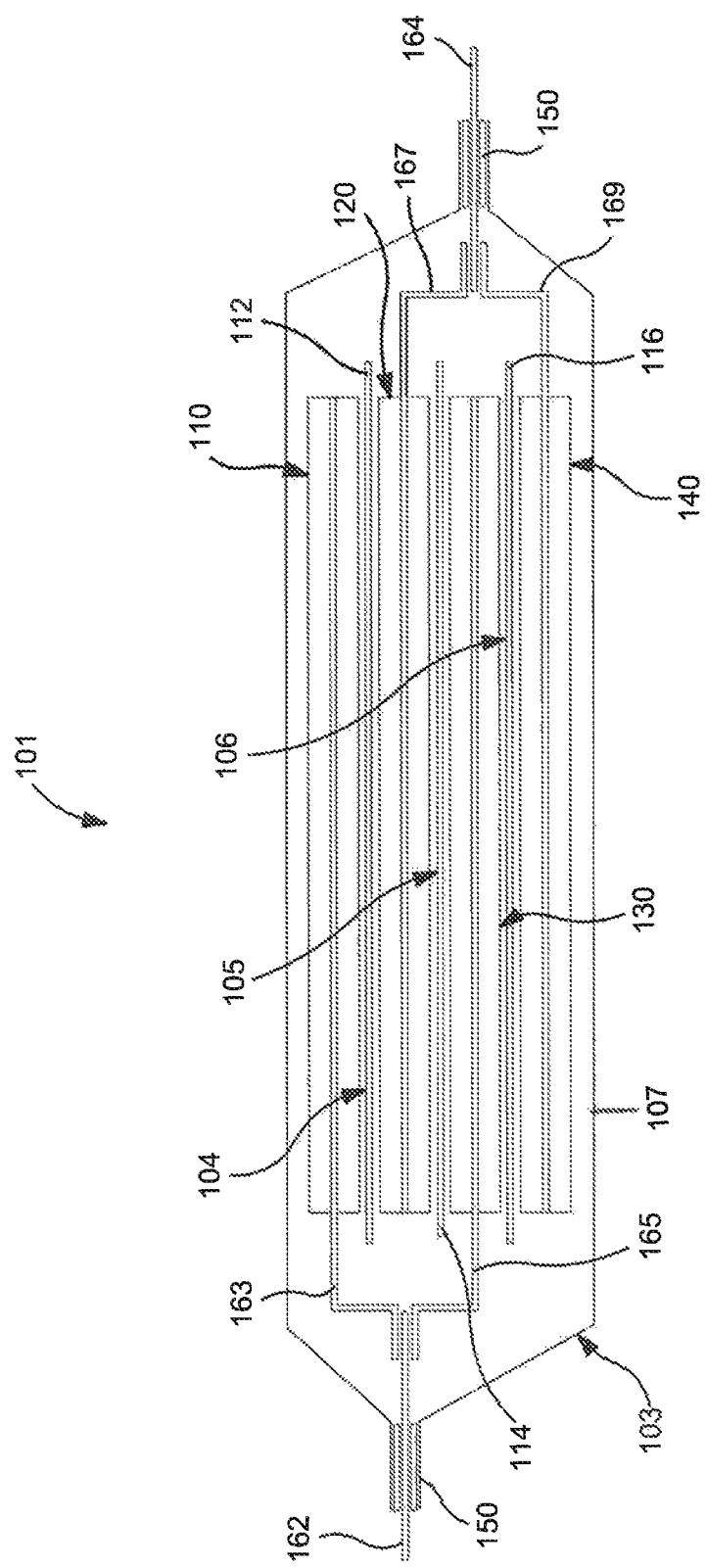
FIG. 3 is a schematic view of one embodiment of the ultracapacitor of the present invention.

Referring to FIG. 3, for example, one embodiment of an ultracapacitor 101 is shown that contains a flexible package 103. In the illustrated embodiment, the package 103 encloses three electrochemical cells 104, 105, and 106, although it should be understood that any number of cells may be employed in the present invention. The first cell 104 is defined by a first electrode 110, second electrode 120, and separator positioned between the electrodes 110 and 120. The second cell 105 is defined by the second electrode 120, a third electrode 130, and separator 114 positioned between the electrodes 120 and 130. The third cell 106 is defined by the third electrode 130, a fourth electrode 140, and separator 116 positioned between the electrodes 130 and 140. An electrolyte (not shown) is also positioned within the package 103. The electrochemical cells 104, 105, and 106 are connected in parallel via a first termination 162 and second termination 164. The first termination 162, for instance, is electrically connected to a lead 163 connected to the first electrode 110 and a lead 165 connected to the third electrode 130. Likewise, the second termination 164 is electrically connected to a lead 167 connected to the second electrode 120 and a lead 169 connected to the fourth electrode 140.

The package 103 generally includes a substrate 107 that extends between two ends and that has edges surrounding the terminations 162 and 164. As noted herein, the substrate may contain multiple layers to provide the desired degree of sealing. The layers may be continuous or discontinuous over the entire package. In the illustrated embodiment, for instance, the substrate contains a discontinuous sealing layer 150 that is located only at the edges of the package 103. The remainder of the substrate may, however, be continuous over the entire package.

As indicated above, the resulting ultracapacitor may exhibit a wide variety of beneficial electrical properties, such as improved capacitance and ESR values. Notably, the ultracapacitor may exhibit excellent electrical properties even when exposed to high temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). The capacitance and ESR values can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0. Such high capacitance values can also be maintained under various extreme conditions, such as when applied with a voltage and/or in a humid atmosphere. For example, the ratio of the capacitance value of the ultracapacitor after being exposed to the hot atmosphere (e.g., 85° C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

The ESR can also remain stable at such temperatures for a substantial period of time, such as noted above. In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

The present invention may be better understood with reference to the following example.

Test Methods

Equivalent Series Resistance (ESR)

Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 23° C., 85° C. or 105° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 23° C., 85° C. or 105° C., and the relative humidity may be 25% or 85%.

Example

The ability to form an electrochemical cell in accordance with the present invention was demonstrated. Initially, each side of two aluminum current collectors (thickness of 12 to 50 μm) containing aluminum carbide whiskers were coated with a mixture of 10-40 wt. % of activated carbon particles, 2-10 wt. % of a styrene-butadiene copolymer, and 5-40 wt. % of sodium carboxymethylcellulose. The activated carbon particles had a D50 size of about 5-20 μm and a BET surface area of about 1300-2200 $m^2/g$. The activated carbon particles contained pores with a size of less than 2 nanometers in an amount of less than 10 vol. %, pores with a size of 2 to 50 nanometers in an amount of about 40 to 70 vol. %, and pores with a size of greater than 50 nm in an amount of about 20 to 50 vol. %. The thickness of each resulting coating was about 12 to 200 μm. The electrodes were then calendered and dried under vacuum at a temperature of from 70° C. to 150° C. Once formed, the two electrodes were assembled with an electrolyte and separators (cellulose material having a thickness of 25 μm). The electrolyte contained 5-azoniaspiro[4,4]-nonanetetrafluoroborate at a concentration of 1.05 to 2.5 M in propylene carbonate. The resulting strip is cut into individual electrodes and assembled by stacking electrodes alternately with separators therebetween. Once the electrode stack is complete, all electrode terminals are welded to a single aluminum terminal. This assembly is then put into a plastic/aluminum/plastic laminated packaging material and all but one of the edges are heat sealed together. Next, the electrolyte is injected into the package through the open edge. The electrolyte-filled package is then put under vacuum and the final edge is heat sealed to complete the finished package. The resulting cells were formed and tested for capacitance and ESR. The results are set forth below in Tables 1-6:

TABLE 1

Average ESR (mohms) for 24 Samples at 0.0 Volt Bias

| | Time (hrs) | | | | | | | | | |
|---|---|---|---|---|---|---|---|---|---|---|
| | 0 | 168 | 336 | 504 | 672 | 840 | 1008 | 1512 | 2040 | 3024 | 4032 |
| 85° C. | 65 | 61 | 59 | 62 | 64 | 63 | 64 | 64 | 62 | 62 | 64 |
| 105° C. | 62 | 54 | 52 | 57 | 60 | 60 | 60 | 58 | 58 | 57 | 58 |

TABLE 2

Average Capacitance for 24 Samples at 0.0 Volt Bias

| | Time (hrs) | | | | | | | | | |
|---|---|---|---|---|---|---|---|---|---|---|
| | 0 | 168 | 336 | 504 | 672 | 840 | 1008 | 1512 | 2040 | 3024 | 4032 |
| 85° C. F | 2.1 | 2.0 | 2.0 | 2.0 | 1.9 | 1.9 | 1.9 | 2.0 | 2.0 | 2.0 | 1.9 |
| 85° C. F/cm³ | 10.3 | 10.1 | 9.8 | 9.7 | 9.7 | 9.7 | 9.7 | 9.7 | 9.7 | 9.7 | 9.6 |
| 105° C. F | 2.0 | 2.0 | 1.9 | 1.9 | 1.9 | 1.9 | 1.9 | 1.9 | 1.9 | 1.9 | 1.8 |
| 105° C. F/cm³ | 9.9 | 9.9 | 9.7 | 9.6 | 9.5 | 9.4 | 9.4 | 9.4 | 9.3 | 9.2 | 9.0 |

TABLE 3

Average ESR (mohms) for 16 Samples at 0.0 Volt Bias

| | Time (hrs) | | | | | | |
|---|---|---|---|---|---|---|---|
| | 0 | 168 | 336 | 504 | 672 | 840 | 1008 |
| 85° C., 85% Relative Humidity | 121 | 133 | 144 | 152 | 166 | 177 | 187 |

TABLE 4

Average Capacitance for 16 Samples at 0.0 Volt Bias

| | | Time (hrs) | | | | | | |
|---|---|---|---|---|---|---|---|---|
| | | 0 | 168 | 336 | 504 | 672 | 840 | 1008 |
| 85° C., 85% Relative Humidity | F | 1.5 | 1.2 | 1.1 | 1.2 | 1.1 | 1.1 | 1.1 |
| 85° C., 85% Relative Humidity | F/cm³ | 7.7 | 5.7 | 5.7 | 6.0 | 5.5 | 5.6 | 5.5 |

TABLE 5

Average ESR (mohms) for 10 Samples at 2.1 Volt Bias

| | Time (hrs) | | | | | | |
|---|---|---|---|---|---|---|---|
| | 0 | 168 | 336 | 504 | 672 | 840 | 1008 |
| 85° C. | 146 | 163 | 167 | 169 | 171 | 173 | 175 |

TABLE 6

Average Capacitance for 16 Samples at 2.1 Volt Bias

| | | Time (hrs) | | |
|---|---|---|---|---|
| | | 0 | 504 | 1008 |
| 85° C., 85% Relative Humidity | F | 2.0 | 1.8 | 1.7 |
| 85° C., 85% Relative Humidity | F/cm³ | 10.1 | 9.2 | 8.7 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor comprising:
   a first electrochemical cell that is defined by a first electrode that contains a current collector having opposing sides coated with a carbonaceous material, a second electrode that contains a current collector having opposing sides coated with a carbonaceous material, and a separator positioned between the first electrode and the second electrode;
   a second electrochemical cell that is connected in parallel with the first cell, wherein the second cell is defined by the second electrode, a third electrode that contains a current collector having opposing sides coated with a carbonaceous material, and a separator positioned between the second electrode and the third electrode;
   a nonaqueous electrolyte that is in ionic contact with the first electrode, second electrode, and third electrodes, wherein the nonaqueous electrolyte contains nonaqueous solvent and an ionic liquid; and
   a package that encloses the first electrochemical cell, the second electrochemical cell, and the nonaqueous electrolyte, wherein the package contains a substrate having a thickness of from about 20 micrometers to about 1,000 micrometers.

2. The ultracapacitor of claim 1, wherein the capacitor exhibits a capacitance of about 6 Farads per cubic centimeter or more as determined at a temperature of 23° C., frequency of 120 Hz, and without an applied voltage.

3. The ultracapacitor of claim 1, wherein the ultracapacitor exhibits an ESR of about 150 mohms or less as determined at a temperature of 23° C., frequency of 1 kHz, and without an applied voltage.

4. The ultracapacitor of claim 1, wherein the current collector of the first electrode, second electrode, third electrode, or a combination thereof, includes a conductive metal.

5. The ultracapacitor of claim 4, wherein the conductive metal is aluminum or an alloy thereof.

6. The ultracapacitor of claim 4, wherein a plurality of fiber-like whiskers project outwardly from the conductive metal.

7. The ultracapacitor of claim 6, wherein the whiskers contain a carbide of the conductive metal.

8. The ultracapacitor of claim 1, wherein the carbonaceous material of the first electrode, second electrode, third electrode, or a combination thereof, contains activated carbon particles.

9. The ultracapacitor of claim 8, wherein at least 50% by volume of the activated carbon particles have a size of from about 0.01 to about 30 micrometers.

10. The ultracapacitor of claim 8, wherein the activated carbon particles contain a plurality of pores, wherein the amount of pores having a size of about 2 nanometers or less is about 50 vol. % or less of the total pore volume, the amount of pores having a size of from about 2 nanometers to about 50 nanometers is about 20 vol. % to about 80 vol. % of the total pore volume, and the amount of pores having a size of about 50 nanometers or more is from about 1 vol. % to about 50 vol. % of the total pore volume.

11. The ultracapacitor of claim 1, wherein the nonaqueous solvent includes propylene carbonate.

12. The ultracapacitor of claim 1, wherein the ionic liquid contains a cationic species and a counterion.

13. The ultracapacitor of claim 12, wherein the cationic species includes an organoquaternary ammonium compound.

14. The ultracapacitor of claim 13, wherein the organoquaternary ammonium compound has the following structure:

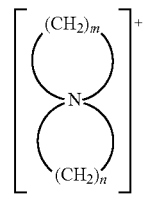

wherein m and n are independently a number from 3 to 7.

15. The ultracapacitor of claim 1, wherein the ionic liquid is present at a concentration of about 1.0 M or more.

16. The ultracapacitor of claim 1, wherein the separator of the first electrochemical cell, the second electrochemical cell, or both includes a cellulosic fibrous material.

17. The ultracapacitor of claim 1, wherein the substrate of the package contains a barrier layer.

18. The ultracapacitor of claim 17, wherein the barrier layer includes a metal.

19. The ultracapacitor of claim 17, wherein the substrate further contains an outer layer.

20. The ultracapacitor of claim 19 wherein the outer layer contains a film that includes a polyolefin, polyester, or a combination thereof.

21. The ultracapacitor of claim 17, wherein the substrate further comprises a sealing layer.

22. The ultracapacitor of claim 21, wherein the sealing layer contains an ionomer.

23. The ultracapacitor of claim 1, wherein the first and second electrochemical cells are stacked together.

24. The ultracapacitor of claim 1, further comprising a first termination that is electrically connected to the first electrode and the third electrode, and a second termination that is electrically connected to the second electrode.

25. The ultracapacitor of claim 1, further comprising a third electrochemical cell that is defined by the third electrode, a fourth electrode that contains a current collector having opposing sides coated with a carbonaceous material, and a separator positioned between the third electrode and the fourth electrode.

26. The ultracapacitor of claim 25, further comprising a first termination that is electrically connected to the first electrode and the third electrode, and a second termination that is electrically connected to the second electrode and the fourth electrode.

* * * * *